US011567482B2

(12) United States Patent
Tezuka et al.

(10) Patent No.: US 11,567,482 B2
(45) Date of Patent: Jan. 31, 2023

(54) MANUFACTURING PROCESS MONITORING APPARATUS

(71) Applicant: TOSHIBA MITSUBISHI-ELECTRIC INDUSTRIAL SYSTEMS CORPORATION, Chuo-ku (JP)

(72) Inventors: Tomoyuki Tezuka, Tokyo (JP); Haruki Inami, Tokyo (JP); Wataru Kameyama, Tokyo (JP); Mutsumi Suganuma, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 649 days.

(21) Appl. No.: 16/476,780

(22) PCT Filed: Aug. 31, 2018

(86) PCT No.: PCT/JP2018/032347
§ 371 (c)(1),
(2) Date: Jul. 9, 2019

(87) PCT Pub. No.: WO2020/044533
PCT Pub. Date: Mar. 5, 2020

(65) Prior Publication Data
US 2020/0159196 A1 May 21, 2020

(51) Int. Cl.
*G05B 19/418* (2006.01)
*G06F 11/00* (2006.01)
*G06F 17/00* (2019.01)

(52) U.S. Cl.
CPC ........ *G05B 19/41875* (2013.01); *G06F 11/00* (2013.01); *G06F 17/00* (2013.01); *G05B 2219/31433* (2013.01)

(58) Field of Classification Search
CPC .... G05B 19/41875; G05B 2219/31433; G05B 2219/33285; G05B 2219/34465;
(Continued)

(56) References Cited

U.S. PATENT DOCUMENTS 6,499,114 B1 * 12/2002 Almstead ........... G05B 19/4184
714/724
11,256,238 B1 * 2/2022 Nixon ................... H04L 67/125
(Continued)

FOREIGN PATENT DOCUMENTS

WO    WO 2017/145318 A1    8/2017

OTHER PUBLICATIONS

Wakamiya et al., The diagnostic system for automatic Gauge control in hot strip mill, (Year: 1998).*
(Continued)

*Primary Examiner* — Mohammad K Islam
(74) *Attorney, Agent, or Firm* — Xsensus LLP (57) ABSTRACT

A manufacturing process monitoring apparatus capable of determining a manufacturing process is anomaly, without requiring any threshold value for determining the as anomaly is provided. The manufacturing process monitoring apparatus includes a data conversion unit configured to convert process data of a manufacturing facility, a feature value analysis unit configured to analyze the converted data based on information on feature values, a data restoration unit configured to restore data for each of a plurality of categories based on the information on the feature values and information on the analyzed result, a similarity calculation unit configured to calculate a similarity for each of the plurality of categories based on the data used when being analyzed and the restored data, a category determination unit configured to determine a category of the data based on the similarity for each of the plurality of categories, a category
(Continued)

classification unit configured to classify the category to which the process data belongs, and a process state diagnostic unit configured to diagnose a state of the manufacturing process based on a result of comparison between the determined category and the classified category.

9 Claims, 4 Drawing Sheets

(58) Field of Classification Search
CPC .... G05B 19/406; G05B 23/02; G05B 19/418; G06F 11/00; G06F 17/00; B21B 38/00; B21C 51/00; G01M 13/00; Y02P 90/02
See application file for complete search history.

(56) References Cited

U.S. PATENT DOCUMENTS

| | | | | |
|---|---|---|---|---|
| 2001/0039481 A1* | 11/2001 | Tremblay | .......... | H01M 8/04552 702/35 |
| 2006/0053123 A1* | 3/2006 | Ide | .......... | G06F 16/35 |
| 2007/0265713 A1* | 11/2007 | Veillette | .......... | G05B 23/0245 700/30 |
| 2010/0094798 A1* | 4/2010 | Shudo | .......... | G06V 20/52 706/54 |
| 2012/0290879 A1* | 11/2012 | Shibuya | .......... | G05B 23/021 714/26 |
| 2012/0296606 A1* | 11/2012 | Hamzaoui | .......... | G05B 19/401 702/184 |
| 2014/0195184 A1* | 7/2014 | Maeda | .......... | G01M 99/00 702/183 |
| 2014/0279795 A1* | 9/2014 | Shibuya | .......... | G05B 23/0221 706/46 |
| 2015/0160098 A1* | 6/2015 | Noda | .......... | G01M 99/00 702/35 |
| 2015/0169393 A1* | 6/2015 | Shibuya | .......... | G05B 23/0243 702/182 |
| 2015/0276557 A1* | 10/2015 | Masuda | .......... | G05B 23/0243 702/182 |
| 2015/0363925 A1* | 12/2015 | Shibuya | .......... | G06K 9/6267 345/440 |
| 2017/0316329 A1* | 11/2017 | Toyama | .......... | G06N 5/048 |
| 2017/0351563 A1* | 12/2017 | Miki | .......... | G06F 11/0751 |

OTHER PUBLICATIONS

International Search Report dated Nov. 13, 2018 in PCT/JP2018/032347 filed Aug. 31, 2018 (with English translation of categories of cited documents).

* cited by examiner

MANUFACTURING PROCESS MONITORING APPARATUS

FIELD

The present invention relates to a manufacturing process monitoring apparatus.

BACKGROUND

Patent Literature 1 discloses an abnormality diagnosis apparatus for a manufacturing facility. The abnormality diagnosis apparatus analyzes and restores collected process data based on feature values extracted from normal data. The abnormality diagnosis apparatus calculates the anomaly degree based on original process data used in the analysis and the restored process data. When the anomaly degree exceeds a preset threshold value, the abnormality diagnosis apparatus determines diagnosis as anomaly.

CITATION LIST

Patent Literature

[PTL 1] International Publication No. WO2017/145318

SUMMARY

Technical Problem

However, in the abnormality diagnosis apparatus described in Patent Literature 1, the setting of the threshold value depends on the data used when extracting the feature values. Therefore, the setting of the threshold value is not easy.

The present invention has been made to solve the above-mentioned problem. An object of the present invention is to provide a manufacturing process monitoring apparatus capable of determining a manufacturing process is anomaly, without requiring any threshold value for determining diagnosis as anomaly.

Solution to Problem

A manufacturing process monitoring apparatus according to the present invention includes a feature value storage unit configured to store information on feature values grasping an operational condition of a manufacturing facility for each of a plurality of categories classified in advance, a data conversion unit configured to convert process data including operational data of the manufacturing facility or measured data by measurement devices provided in the manufacturing facility, a feature value analysis unit configured to analyze the data converted by the data conversion unit based on the information on the feature values stored in the feature value storage unit, a data restoration unit configured to restore data for each of the plurality of categories based on the information on the feature values stored in the feature value storage unit and information on the result analyzed by the feature value analysis unit, a similarity calculation unit configured to calculate a similarity for each of the plurality of categories based on the data used when being analyzed by the feature value analysis unit and the data restored by the data restoration unit, a category determination unit configured to determine a category of the data based on the similarity for each of the plurality of categories calculated by the similarity calculation unit, a category classification unit configured to classify the category to which the process data belongs, and a process state diagnostic unit configured to diagnose a state of the manufacturing process based on result of comparison between the category determined by the category determination unit and the category classified by the category classification unit.

Advantageous Effects of Invention

According to the present invention, the state of the manufacturing process is diagnosed based on result of comparison between the category determined by the category determination unit and the category classified by the category classification unit. Therefore, it is possible to determine the manufacturing process is anomaly, without requiring any threshold value for determining diagnosis as anomaly.

DESCRIPTION OF EMBODIMENTS

Embodiments of the present invention will be described with reference to the attached drawings. In the drawings, the same or corresponding parts are denoted by the same reference numerals. Duplicate descriptions of the related parts are simplified or omitted appropriately.

First Embodiment

Figure 1:
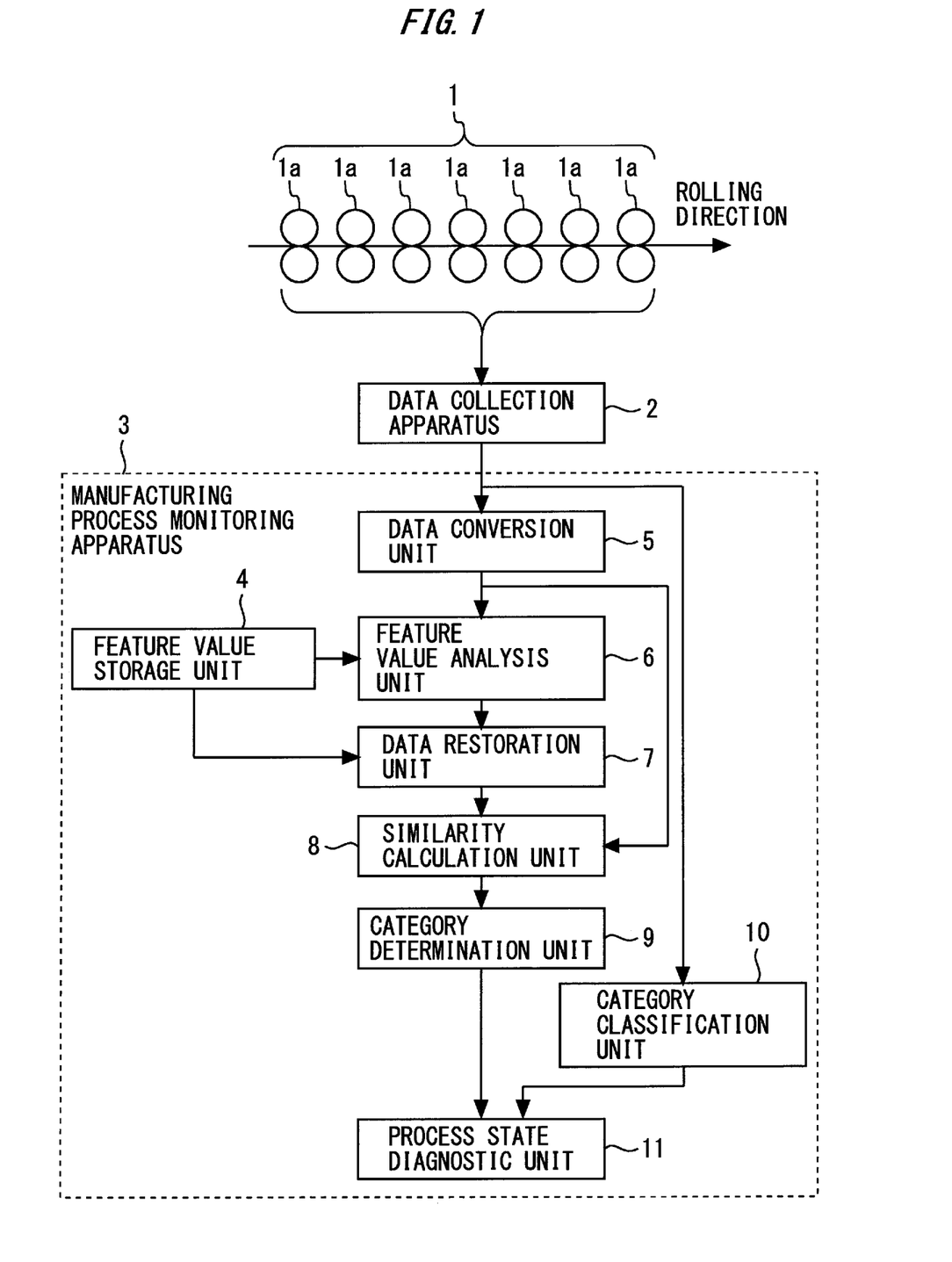
FIG. 1 is a diagram illustrating a configuration of a hot strip finishing mill to which a manufacturing process monitoring apparatus according to a first embodiment can be applied.

FIG. 1 is a diagram illustrating a configuration of a hot strip finishing mill to which a manufacturing process monitoring apparatus according to a first embodiment can be applied.

In FIG. 1, a hot strip finishing mill 1 is schematically illustrated. For example, the hot strip finishing mill 1 includes seven rolling mills 1a. Measurement devices including sensors such as a thickness meter and a shape meter are not illustrated. A material to be rolled flows in an illustrated rolling direction. As a result, the material to be rolled is rolled by the seven rolling mills 1a so as to have a desired thickness.

A data collection apparatus 2 periodically or intermittently collects process data including operational data of the hot strip finishing mill 1, measurement data of the measurement device provided in the hot strip finishing mill 1, and information on rolled material required for manufacturing a product. For example, the data collection apparatus 2 collects data on setting values for each apparatus of the hot strip finishing mill 1. For example, the data collection apparatus 2 collects data on actual values for each apparatus of the hot strip finishing mill 1. For example, the data collection apparatus 2 collects data on measurement values by the sensors. For example, the data collection apparatus 2 collects data on the amount manipulated by a control system for obtaining a desired product. For example, the data collection apparatus 2 collects data on the steel grade, size, and temperature of the material to be rolled on an entry side and a delivery side of the hot strip finishing mill 1.

A manufacturing process monitoring apparatus 3 includes a feature value storage unit 4, a data conversion unit 5, a feature value analysis unit 6, a data restoration unit 7, a similarity calculation unit 8, a category determination unit 9, a category classification unit 10, and a process state diagnostic unit 11.

The feature value storage unit 4 extracts information on feature quantities grasping a normal operational condition of a manufacturing facility for each of a plurality of categories classified in advance and stores the extracted information. For example, the categories are classified by steel grade, product thickness, product width, temperature, and the like. For example, the feature values can be extracted by a method based on the principal component analysis. According to the method based on the principal component analysis, a principal component can be extracted as feature values. For example, the feature values can be extracted by a method using sparse coding. For example, according to the method using the sparse coding, a set of bases can be extracted as feature values.

Among the data to be used in the extraction of the feature values, the magnitude of the value possibly is different. If the difference is large, some data affects greatly extraction of feature values. Therefore, normalization processing is performed on the collected data before extracting the feature values. For example, the normalization processing can be expressed by the following formula (1) based on an average value and a standard deviation of the data to be used in the extraction of the feature values.

[Math. 1]

$$\tilde{x}_{ik} = \frac{x_{ik} - \bar{x}_i}{\sigma_i} \quad (1)$$

Here, $\tilde{x}_{ik}$ is a value after normalization of a sampling time k of the i-th data, and $x_{ik}$ is a value before the normalization of the sampling time k of the i-th data. $\bar{x}_i$ is an average value of the i-th data, and $\sigma_i$ is a standard deviation of the i-th data.

Also, filter processing using a low-pass filter or the like may be performed before the normalization is performed. In this case, noises can be removed.

In addition, L2 normalization processing may be performed so that the magnitude of the data can be aligned for each sampling time. For example, in the L2 normalization processing, the processing of the following formula (2) is performed for each sampling time.

[Math. 2]

$$\hat{x}_{ik} = \frac{\tilde{x}_{ik}}{\sqrt{\sum_i (\tilde{x}_{ik})^2}} \quad (2)$$

The data conversion unit 5 converts data sent from the data collection apparatus 2. For example, the data conversion unit 5 performs the normalization processing and the L2 normalization processing on the data sent from the data collection apparatus 2 based on the average value and the standard deviation used when extracting the information on feature values stored in the feature value storage unit 4.

The feature value analysis unit 6 receives the data converted by the data conversion unit 5. The feature value analysis unit 6 analyzes the data converted by the data conversion unit 5 based on the information on feature quantities stored in the feature value storage unit 4. The analysis is performed according to a method same as that used when extracting the feature values. In the case of extracting the feature values by the principal component analysis, the analysis result is a coefficient when written by the principal component. In the case of using the sparse coding, a sparse coefficient corresponds to the analysis result.

The data restoration unit 7 restores the data based on the information on feature quantities stored in the feature value storage unit 4 and the result analyzed by the feature value analysis unit 6. The restoration of the data is performed for each of the plurality of categories. More specifically, the data restoration unit 7 extracts components corresponding to each of the plurality of categories from the analyzed result and sequentially restores the extracted components. As a result, restoration data whose number is equivalent to that of the plurality of categories can be generated.

The similarity calculation unit 8 calculates a similarity for each of the plurality of categories based on the data restored for each of the plurality of categories by the data restoration unit 7 and the data subjected to the normalization processing and the L2 normalization processing by the data conversion unit 5. For example, the similarity is an absolute value of a difference between respective data. For example, the similarity is the square of the difference between respective data.

The category determination unit 9 determines the category of the data used for the analysis based on the similarity for each of the plurality of categories calculated by the similarity calculation unit 8. When the similarity is set as the absolute value of the difference between respective data or the square of the difference between respective data in the similarity calculation unit 8, the category determination unit 9 determines that a category of data is a category whose similarity value is smallest.

The category classification unit 10 classifies the category to which the process data collected by the data collection apparatus 2 belongs.

The process state diagnostic unit 11 diagnoses the state of the manufacturing process in the hot strip finishing mill 1 based on result of comparison between the category determined by the category determination unit 9 and the category classified by the category classification unit 10.

Figure 2:
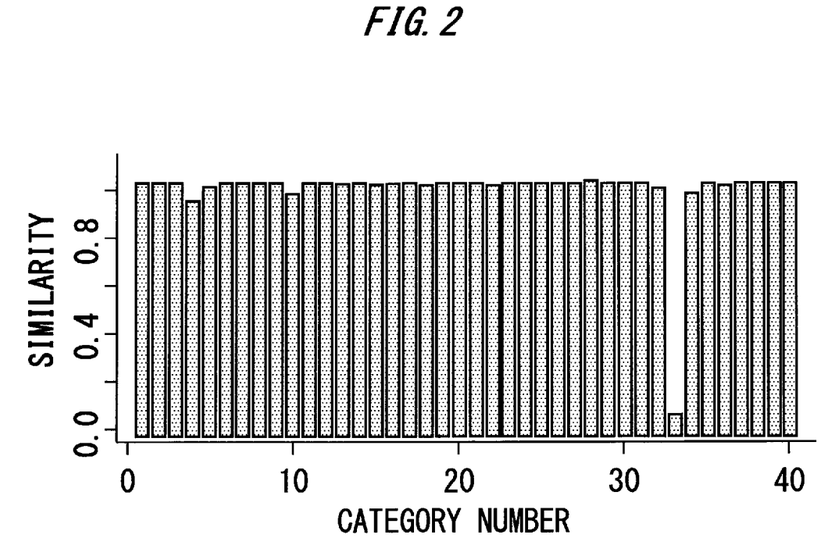
FIG. 2 is a diagram illustrating an example of the similarity for each category by the manufacturing process monitoring apparatus according to the first embodiment.

Next, an example of the similarity for each of the plurality of categories will be described with reference to FIG. 2. FIG. 2 is a diagram illustrating an example of the similarity for each of the plurality of categories calculated by the manufacturing process monitoring apparatus according to the first embodiment.

FIG. 2 illustrates the classification ranging from the first category to the 40th category. The similarity value of the 33rd category is smallest. In this case, the category determination unit 9 determines that the category of the data used in the analysis is the 33rd category.

Figure 3:
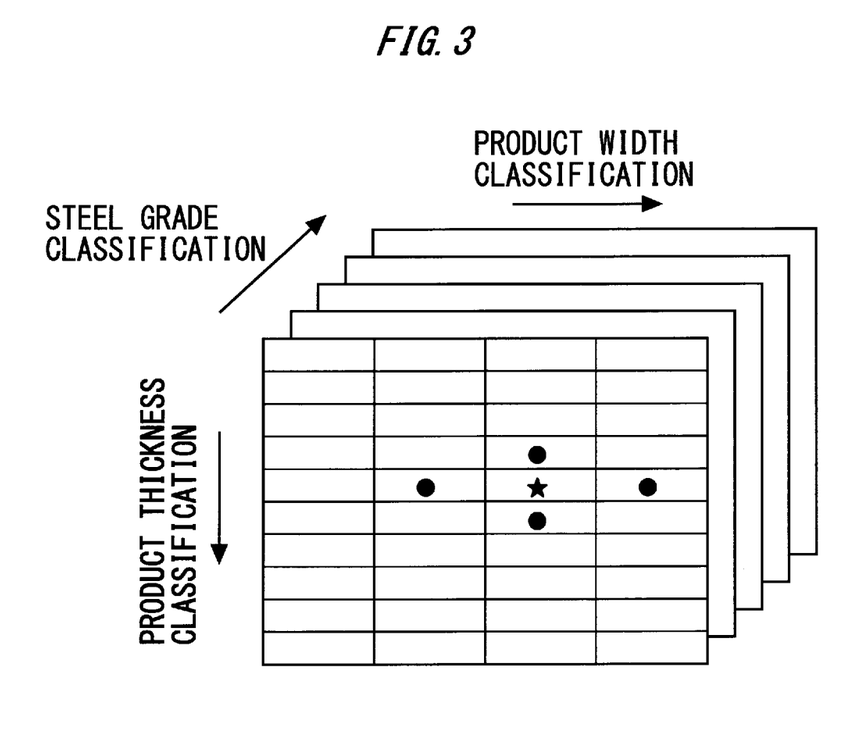
FIG. 3 is a diagram illustrating a monitoring method by the manufacturing process monitoring apparatus according to the first embodiment.

Next, with reference to FIG. 3, a diagnostic method in the case of classifying the categories by the product steel grade, product thickness, and product width will be described. FIG. 3 is a diagram illustrating a diagnostic method by the manufacturing process monitoring apparatus according to the first embodiment.

The classification of categories is not necessarily performed with nonconsecutive data. For example, when the product thickness is selected as one of indices in the classification of categories, there is no large difference in the state of process between neighboring divisions with respect to the product thickness. Therefore, if there is some variation in the data to be analyzed, especially the data on product thickness in the vicinity of the division is possibly determined as belonging to a category corresponding to a neighboring division.

In order to avoid such a situation, when classifying the categories in advance, the allowance range of a determined category is preset in consideration of the properties of the indices used in the classification. When the determined category exceeds the allowance range of the category to which the collected process data belongs, the process state diagnostic unit 11 determines that there is a possibility that anomaly has occurred in the manufacturing process.

When classifying the categories in advance, the allowance range is set so as to include the category corresponding to the neighboring division with respect to the product thickness or the product width.

In FIG. 3, when the category to which the collected process data belongs is a category indicated by an asterisk, if the category determined is the category indicated by the asterisk or a category indicated by a circle, the process state diagnostic unit 11 determines that the manufacturing process is normal.

Figure 4:
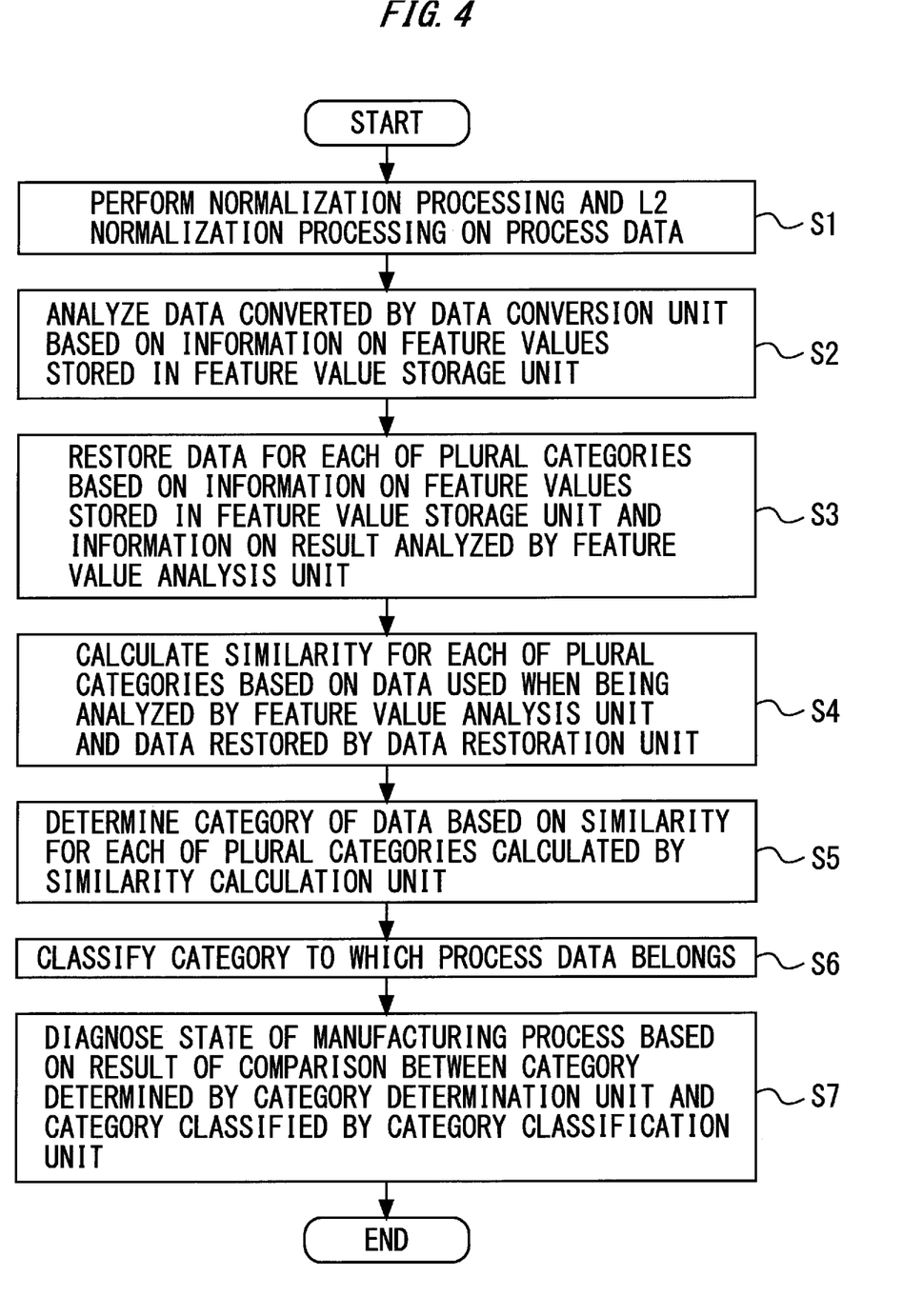
FIG. 4 is a flowchart illustrating the outline of the operation of the manufacturing process monitoring apparatus according to the first embodiment.

Next, the outline of an operation of the manufacturing process monitoring apparatus 3 will be described with reference to FIG. 4. FIG. 4 is a flowchart illustrating the outline of the operation of the manufacturing process monitoring apparatus according to the first embodiment.

In step S1, the manufacturing process monitoring apparatus 3 performs the normalization processing and the L2 normalization processing on the process data in the data conversion unit 5. Subsequently, the manufacturing process monitoring apparatus 3 performs an operation of step S2. In step S2, the manufacturing process monitoring apparatus 3 analyzes the data converted by the data conversion unit 5, in the feature value analysis unit 6, based on the information on feature values stored in the feature value storage unit 4.

Subsequently, the manufacturing process monitoring apparatus 3 performs an operation of step S3. In step S3, the manufacturing process monitoring apparatus 3 restores the data for each of the plurality of categories, in the data restoration unit 7, based on the information on feature values stored in the feature value storage unit 4 and information on the result analyzed by the feature value analysis unit 6. Subsequently, the manufacturing process monitoring apparatus 3 performs an operation of step S4. In step S4, the manufacturing process monitoring apparatus 3 calculates a similarity for each of the plurality of categories, in the similarity calculation unit 8, based on the data used when being analyzed by the feature value analysis unit 6 and the data restored by the data restoration unit 7.

Subsequently, the manufacturing process monitoring apparatus 3 performs an operation of step S5. In step S5, the manufacturing process monitoring apparatus 3 determines the category of the data, in the category determination unit 9, based on the similarity for each of the plurality of categories calculated by the similarity calculation unit 8. Subsequently, the manufacturing process monitoring apparatus 3 performs an operation of step S6. In step S6, the manufacturing process monitoring apparatus 3 classifies the category to which the process data belongs in the category classification unit 10.

Subsequently, the manufacturing process monitoring apparatus 3 performs an operation of step S7. In step S7, the manufacturing process monitoring apparatus 3 diagnoses the state of the manufacturing process, in the process state diagnostic unit 11, based on result of comparison between the category determined by the category determination unit 9 and the category classified by the category classification unit 10. Subsequently, the manufacturing process monitoring apparatus 3 terminates the operation.

According to the first embodiment described above, the state of the manufacturing process is diagnosed based on the result of comparison between the category determined by the category determination unit 9 and the category classified by the category classification unit 10. Therefore, it can be determined the manufacturing process is anomaly, without requiring any threshold value for determining diagnosis as anomaly.

For example, when the category determined by the category determination unit 9 is different from the category classified by the category classification unit 10, it is determined that the manufacturing process is anomaly. Therefore, the determination for the manufacturing process can be performed under more strict conditions.

Alternatively, when the category determined by the category determination unit 9 is different from the category classified by the category classification unit 10 a preset number of times within a preset period, it may be possible to determine that the manufacturing process is anomaly. In this case, even when a sudden change in data or the like occurs, the state of the manufacturing process can be correctly determined.

For example, as illustrated in FIG. 3, when the category determined by the category determination unit 9 and the category classified by the category classification unit 10 do not satisfy a preset relation, it is determined that the manufacturing process is anomaly. Therefore, the state of the manufacturing process can be determined more correctly.

Alternatively, when the category determined by the category determination unit 9 and the category classified by the category classification unit 10 do not satisfy a preset relation a preset number of times within a preset period, it may be possible to determine that the manufacturing process is anomaly. In this case, even when a sudden change in data or the like occurs, the state of the manufacturing process can be correctly determined.

The categories may be appropriately arranged according to the manufacturing process to be monitored. For example, the temperature of the material to be rolled may be used as an index for categories. For example, the entry thickness when entering the rolling mill may be used as an index for categories.

Further, when it is determined that the manufacturing process is anomaly, an alarm may be notified to a maintenance personnel. In this case, it is unnecessary for the maintenance personnel to perform constant monitoring. As a result, not only the burden on the maintenance personnel can be reduced but also the maintenance can be performed before a serious failure occurs.

Further, when it is determined that the manufacturing process is anomaly, an alarm may be notified to an operator. In this case, the operator is urged to intervene. As a result, by quickly changing the manufacturing process to an appropriate state, the occurrence of defects can be prevented in advance and the quality of the product can be secured in a stable manner.

The manufacturing process monitoring apparatus 3 according to the first embodiment may be applied to a manufacturing facility different from the hot strip finishing mill 1. For example, the manufacturing process monitoring apparatus 3 according to the first embodiment may be applied to a continuous cold rolling mill. For example, the manufacturing process monitoring apparatus 3 according to the first embodiment may be applied to an annealing line. For example, the manufacturing process monitoring apparatus 3 according to the first embodiment may be applied to a plate mill.

Figure 5:
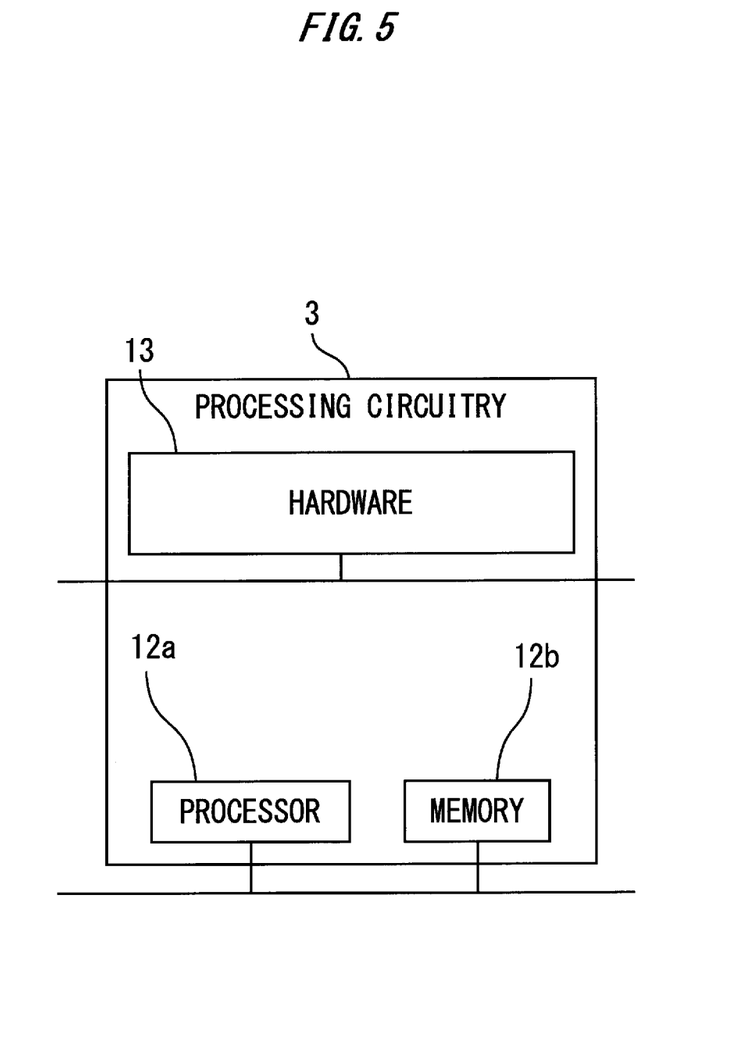
FIG. 5 is a diagram illustrating a hardware configuration of the manufacturing process monitoring apparatus according to the first embodiment.

Next, an example of the manufacturing process monitoring apparatus 3 will be described with reference to FIG. 5. FIG. 5 is a diagram illustrating a hardware configuration of the manufacturing process monitoring apparatus according to the first embodiment.

Each function of the manufacturing process monitoring apparatus 3 can be realized by a processing circuitry. For example, the processing circuitry includes at least one processor 12a and at least one memory 12b. For example, the processing circuitry includes at least one dedicated hardware 13.

When the processing circuitry includes the at least one processor 12a and the at least one memory 12b, each function of the manufacturing process monitoring apparatus 3 can be realized by software, firmware, or a combination of software and firmware. At least one of the software and the firmware is described as a program. At least one of the software and the firmware is stored in the at least one memory 12b. The at least one processor 12a realizes each function of the manufacturing process monitoring apparatus 3 by reading and executing the program stored in the at least one memory 12b. The at least one processor 12a may be referred to as a central processing unit, a processor, arithmetic unit, a microprocessor, a microcomputer, or a DSP. For example, the at least one memory 12b is a nonvolatile or volatile semiconductor memory such as RAM, ROM, flash memory, EPROM, EEPROM, a magnetic disk, a flexible disk, an optical disk, a compact disk, a mini disk, a DVD, or the like.

When the processing circuitry includes the at least one dedicated hardware 13, the processing circuitry can be realized by, for example, a single circuit, a composite circuit, a programmed processor, a parallel programmed processor, ASIC, FPGA, or a combination thereof. For example, each function of the manufacturing process monitoring apparatus 3 can be respectively realized by the processing circuitry. For example, each function of the manufacturing process monitoring apparatus 3 can be collectively realized by the processing circuitry.

Part of each function of the manufacturing process monitoring apparatus 3 may be realized by the dedicated hardware 13 and the rest may be realized by software or firmware. For example, functions of the feature value storage unit 4 may be realized by the processing circuitry as the dedicated hardware 13, and functions other than the functions of the feature value storage unit 4 may be realized by the at least one processor 12a reading and executing the program stored in the at least one memory 12b.

In this manner, the processing circuitry realizes each function of the manufacturing process monitoring apparatus 3 by the hardware 13, software, firmware, or a combination thereof.

INDUSTRIAL APPLICABILITY

As mentioned above, the manufacturing process monitoring apparatus according to the present invention can be used for manufacturing facilities.

REFERENCE SIGNS LIST 1 hot strip finishing mill
2 data collection apparatus
3 manufacturing process monitoring apparatus
4 feature value storage unit
5 data conversion unit
6 feature value analysis unit
7 data restoration unit
8 similarity calculation unit
9 category determination unit
10 category classification unit
11 process state diagnostic unit
12a processor
12b memory
13 hardware

The invention claimed is:

1. A manufacturing process monitoring apparatus comprising:
   circuitry configured to
      periodically collect data on a material to be rolled at an entry side of a rolling mill and a delivery side of the rolling mill;
      store information on feature values of a material processed under a normal operational condition of the rolling mill during a manufacturing process for each of a plurality of categories, each category regarding a different characteristic of the material, the plurality of categories including at least two of material grade, material thickness, material width, and material temperature, classified by the material grade, material thickness, and material width in advance;
      convert current process data including operational data of the rolling mill or measured data from sensors in the rolling mill and feature values of a current material being processed;
      analyze converted current process data based on stored information on the feature values;
      restore data for each of the plurality of categories based on the stored information on the feature values and analyzed converted current process data;
      calculate a similarity for each of the plurality of categories based on the converted current process data and restored data;
      determine a category of the converted current process data based on the similarity for each of the plurality of categories;
      classify the category to which the current process data belongs;
      diagnose a state of the manufacturing process based on result of comparison between the determined category and the classified category; and
      on condition that the state of the manufacturing process is diagnosed as an anomaly, make an operational condition of the rolling mill different than a normal operational condition.

2. The manufacturing process monitoring apparatus according to claim 1, wherein the circuitry is configured to determine that the manufacturing process is anomaly when the determined category is different from the classified category or when the determined category is different from the classified category a preset number of times within a preset period.

3. The manufacturing process monitoring apparatus according to claim 1, wherein the circuitry is configured to determine that the manufacturing process is anomaly when the determined category and the classified category do not satisfy a preset relation or when the determined category and the classified category do not satisfy the preset relation a preset number of times within a preset period.

4. A manufacturing process monitoring method, comprising:

periodically collecting data on a material to be rolled at an entry side of a rolling mill and a delivery side of the rolling mill;
 storing information on feature values of a material processed under a normal operational condition of the rolling mill during a manufacturing process for each of a plurality of categories, each category regarding a different characteristic of the material, the plurality of categories including at least two of material grade, material thickness, material width, and material temperature, classified by the material grade, material thickness, and material width in advance;
 converting current process data including operational data of the rolling mill or measured data from sensors in the rolling mill and feature values of a current material being processed;
 analyzing converted current process data based on stored information on the feature values;
 restoring data for each of the plurality of categories based on the stored information on the feature values and converted current process data;
 calculating a similarity for each of the plurality of categories based on the converted current process data and restored data;
 determining a category of the converted current process data based on the similarity for each of the plurality of categories;
 classifying the category to which the current process data belongs;
 diagnosing a state of the manufacturing process based on result of comparison between the determined category and the classified category; and
 on condition that the state of the manufacturing process is diagnosed as an anomaly, making an operational condition of the rolling mill different than a normal operational condition.

5. The method according to claim 4, further comprising determining that the manufacturing process is anomaly when the determined category is different from the classified category or when the determined category is different from the classified category a preset number of times within a preset period.

6. The method according to claim 4, further comprising determining that the manufacturing process is anomaly when the determined category and the classified category do not satisfy a preset relation or when the determined category and the classified category do not satisfy the preset relation a preset number of times within a preset period.

7. A non-transitory computer readable storage device having computer readable instructions that when executed by circuitry cause the circuitry to:

periodically collect data on a material to be rolled at an entry side of a rolling mill and a delivery side of the rolling mill;
 store information on feature values of a material processed under a normal operational condition of the rolling mill during a manufacturing process for each of a plurality of categories, each category regarding a different characteristic of the material, the plurality of categories including at least two of material grade, material thickness, material width, and material temperature, classified by the material grade, material thickness, and material width in advance;
 convert current process data including operational data of the rolling mill or measured data from sensors in the rolling mill and feature values of a current material being processed;
 analyze converted current process data based on stored information on the feature values;
 restore data for each of the plurality of categories based on the stored information on the feature values and converted current process data;
 calculate a similarity for each of the plurality of categories based on the converted current process data and restored data;
 determine a category of the converted current process data based on the similarity for each of the plurality of categories;
 classify the category to which the current process data belongs;
 diagnose a state of the manufacturing process based on result of comparison between the determined category and the classified category; and
 on condition that the state of the manufacturing process is diagnosed as an anomaly, make an operational condition of the rolling mill different than a normal operational condition.

8. The non-transitory computer readable storage device according to claim 7, wherein the circuitry is configured to determine that the manufacturing process is anomaly when the determined category is different from the classified category or when the determined category is different from the classified category a preset number of times within a preset period.

9. The non-transitory computer readable storage device according to claim 7, wherein the circuitry is configured to determine that the manufacturing process is anomaly when the determined category and the classified category do not satisfy a preset relation or when the determined category and the classified category do not satisfy the preset relation a preset number of times within a preset period.

* * * * *